(12) United States Patent
Chen et al.

(10) Patent No.: US 6,966,968 B2
(45) Date of Patent: Nov. 22, 2005

(54) PROCESS AND APPARATUS FOR JOINING POLYMER MATERIALS AT A HIGH WELDING SPEED

(75) Inventors: Jie-Wei Chen, Alpnach Dorf (CH); Adolf Niederberger, Kaegiswil (CH)

(73) Assignee: Leister Process Technologies, Sarnen (CH)

( * ) Notice: Subject to any disclaimer, the term of this patent is extended or adjusted under 35 U.S.C. 154(b) by 501 days.

(21) Appl. No.: 10/172,537

(22) Filed: Jun. 13, 2002

(65) Prior Publication Data

US 2003/0213552 A1 Nov. 20, 2003

(30) Foreign Application Priority Data

May 16, 2002 (EP) ............................................ 02010925

(51) Int. Cl.[7] .......................... B29L 65/16; B23K 26/73
(52) U.S. Cl. ............................... 156/379.8; 156/380.9; 156/499; 156/555
(58) Field of Search ................................ 156/359, 378, 156/379.6, 379.8, 380.9, 499, 543, 555, 582, 272.8, 275.1; 219/121.6, 121.63, 121.64

(56) References Cited

U.S. PATENT DOCUMENTS 3,924,533 A * 12/1975 Gaynor ....................... 101/467
5,512,126 A * 4/1996 Kannabiran et al. ...... 156/380.9
6,270,599 B1 * 8/2001 Wood ............................ 156/64
6,463,981 B1 * 10/2002 Kerr ............................ 156/555

FOREIGN PATENT DOCUMENTS

SE 510621 C2 * 6/1999 ........... A61F/13/15

* cited by examiner

Primary Examiner—John T. Haran
(74) Attorney, Agent, or Firm—Bachman & LaPointe, P.C.

(57) ABSTRACT

Process and apparatus for joining endless polymer materials by means of the transillumination technique. According to the invention, in order to be joined, the endless materials are guided through two contrarotating rollers that press against each other. The first roller consists of a material that is transparent to laser beams and is tubular. The second roller is formed from a material that can be deformed easily at the surface, so that its surface can adapt to the shape of the first roller. Devices for producing a laser beam at the contact surface between the materials to be joined are arranged in the first roller. In this case, the beam is formed as a linear laser beam longitudinally with respect to the direction of movement of the materials so that during the passage, continuous heating of the material up to the melting point is achieved, without an excessively high laser output having to be provided. By means of the process and the apparatus, continuous joining is possible at high speed.

4 Claims, 3 Drawing Sheets

PROCESS AND APPARATUS FOR JOINING POLYMER MATERIALS AT A HIGH WELDING SPEED

BACKGROUND OF THE INVENTION

The present invention relates to a process and an apparatus for joining polymer materials at a high welding speed.

It is known to join polymer materials by means of laser beams in that the upper material, facing the laser beam, is shone through by the latter and, at the contact surface between the upper material, which is transparent to the laser beam, and the lower material, which is opaque to the laser beam, the two materials are heated and joined to each other under pressure. The material that is transparent to the laser beam may be optically black in the visible wavelength range. In addition, for this purpose it is known to produce a linear laser beam, a relative movement between the materials and the laser beam taking place during the welding operation in order to produce the desired welding contour.

A precondition for the welding process according to this transillumination technique is the thermal response of the polymer under IR irradiation. The polymer, pigmented with IR-absorbing substances, absorbs the thermal energy from the IR source (laser source) under irradiation and is heated. The accumulation of the thermal energy and the temperature therefore reached in the polymer depend on the manner in which the energy is metered, such as energy density and irradiation time, for example. In addition, the material characteristics, such as the thermal conductivity, for example, are of significance. The critical step for the welding process is the phase transition between the solid body state into the liquefaction state, which is also referred to in the following text as the melting temperature. In order to reach this melting temperature, a certain heating time is needed, because of the low thermal conductivity of the polymer. In principle, it is possible to implement a shortening in the irradiation time with a correspondingly high energy rate. However, this measure reduces the size of the process window in which individual adaptation of the process parameters is possible and, as a result, has a considerably adverse affect on the welding quality.

Endless film material can be used, for example, as part of a micromechanical component, sensors, actuators etc., the film material also being the transport means for the component at the same time. In addition, endless film material can be used for packaging such components transported on a film or other objects to be packaged. In order to produce welded endless films of this type, it is important to implement a welding operation that is as accurate as possible but also fast.

SUMMARY OF THE INVENTION

The present invention is therefore based on the object of proposing a possible way in which the films can be joined at a high welding speed.

According to the invention, this object is achieved by the features of the process and the apparatus of the invention.

According to the process, in order to produce a welded seam running in the longitudinal direction, a process zone is provided in which the material is heated continuously to the melting temperature in a preheating zone by means of laser beams and is subsequently melted in a melting zone. The third phase of the process zone, namely the cooling phase, is not covered by the laser beam. According to the invention, the desired higher welding speed is implemented by adapting the dimension of the area covered by the laser beam. For this purpose, a lengthened process zone is provided along the direction of movement, which automatically lengthens the irradiation time and therefore permits a high welding speed with, nevertheless, a sensible welding quality. An increase in the welding speed can therefore be achieved by lengthening the process zone. To this end, it is required for a particular radiation form of the laser beam to be implemented, which simultaneously permits both the melting process and the preheating process in a compact process operation. A preheating process (zone) for the polymer, integrated in the laser beam, is a significant feature for the high welding speed which may possibly be implemented.

Preferably, a linear process zone is provided for this purpose. This is produced, at least partly, by means of a laser beam which is collimated in such a way that its width can be adjusted by means of appropriate optics. In the vertical direction, the form of the laser line is independent of the distance of the contact surface from the laser optics.

In the process, it is important that the linear laser beam aligned in the direction of movement strikes the contact surface in the entire process zone. The supporting background must therefore provide at least an area corresponding to this length.

In order to provide additional energy for the welding operation after the melting temperature has been reached, according to a further refinement of the process it is possible to provide a further point-like laser beam with a high energy density following the linear irradiation zone.

In order to measure temperature, a pyrometer for the IR measurement of the temperature can also be provided at this point, it being possible for the same optics for the beam guidance to be used both for the provision of the point-like laser beam and also for the IR measurement. This measurement can be used to observe the melting zone and to control the laser output accordingly.

According to a preferred embodiment, the materials are guided through two contrarotating rollers that press against each other, the laser beam being brought into the irradiation zone by a first roller that is transparent to the laser beam. In this way, the appropriate advance of the films can be ensured. In this case, it is important that, as previously mentioned, the contact surface is covered by the linear laser beam. This means that the first roller has a corresponding large diameter. At the same time, according to a further advantageous embodiment of the invention, the second roller is formed in such a way that it deforms easily at its outer circumference and, as a result, provides a desired long process zone, since the contact area between the two rollers is not restricted to a line located transversely with respect to the transport direction, as is otherwise usual.

Furthermore, it is important for the process, as indicated at the beginning, that the materials are joined to each other under pressure. This can be carried out directly following the process zone. According to a preferred embodiment of the process, the materials are already pressed together in the area of the irradiation zone.

As a result of the deformation of the second roller, the two materials to be joined are pressed together directly with appropriate pressure during melting. The deformation of the second roller also necessarily effects a curvature of the two joined materials in accordance with the radius of the first transparent roller. It is consequently necessary for the joined materials then to be rolled up in the direction of curvature which occurs during the welding. Rolling up in the opposite direction has a detrimental effect on the welded joint and/or the materials joined to each other. In the case of a first roller with a very large radius, the curvature effect is minimized.

The transparent roller can be made of glass, transparent polymer, for example PMMA, or other suitable materials, for example. In order to provide a laser beam with desired width in the contact surface, either a beam of the desired width can be produced by appropriate optics or, by means of appropriate scanning to and fro at a sufficient speed, an irradiation zone can be produced which is wider than the laser line. In order to bring the laser beam through the first roller onto the materials, a corresponding laser source can be arranged in the roller. However, said source is preferably arranged outside the roller, and the laser beam is brought into the desired area by means of appropriate deflection devices.

According to a further embodiment of the process, the first transparent roller is cleaned on the outer surface before making contact with the materials in order to remove dirt particles which adhere thereto and which originate from the materials, in order that the energy transfer required for the welding operation is not impaired by the roller. This can be carried out, for example, mechanically by means of correspondingly suitable brushes and/or by means of compressed air or vacuum, electrically (antistatic coating) or in any other manner suitable for the respective application.

A further parameter which is important for an optimal joint is the application of the necessary pressure. In order to monitor this, the contact pressure can be determined by means of flat pressure sensors which are arranged on the surface of the second roller, are generally known and are customary. The values supplied by the pressure sensors are evaluated in an appropriate open-loop and closed-loop control unit connected thereto and one of the rollers, preferably the deformable roller, is adjusted accordingly.

In order to produce a welding contour which differs from a normal linear shape, it is possible to arrange a mask on the transparent roller. Depending on the beam quality, this mask can be arranged on the inside or the outside. A typical example of the arrangement of a mask in such a way that it covers a certain area of the material to be welded during the rotation of the roller, is the production of a welded seam that is interrupted continuously in the transport direction.

The apparatus for joining endless materials comprises two rollers which run in opposite directions and press against each other, the first roller being constructed from a material that is transparent to laser beams and being tubular, and the second, opposing roller being produced from a material which can be deformed easily at the surface. Furthermore, devices for producing at least one laser beam at the contact surface are arranged in the first roller. These devices can be devices that generate the laser beam and also deflecting devices, which bring the laser beam generated outside the roller to the desired position. The roller that can be deformed easily at its outer circumference, at least in the outer area, is produced from a resilient material produced with an appropriate softness.

According to a preferred embodiment, a device for the IR measurement of the temperature is arranged in the first roller, and is preferably designed such that it can be moved with regard to the measurement point. This permits the checking of the desired process phase and the corresponding evaluation in an open-loop and closed-loop control device.

The devices for producing at least one laser beam produce a laser beam arranged in the direction of movement of the materials in the contact zone. A point-like laser beam arranged after the linear laser beam in the direction of movement can preferably additionally be provided following said contact zone.

BRIEF DESCRIPTION OF THE DRAWINGS

In the following text, the invention will be explained in more detail using the accompanying drawings, in which.

DETAILED DESCRIPTION

Figure 1:
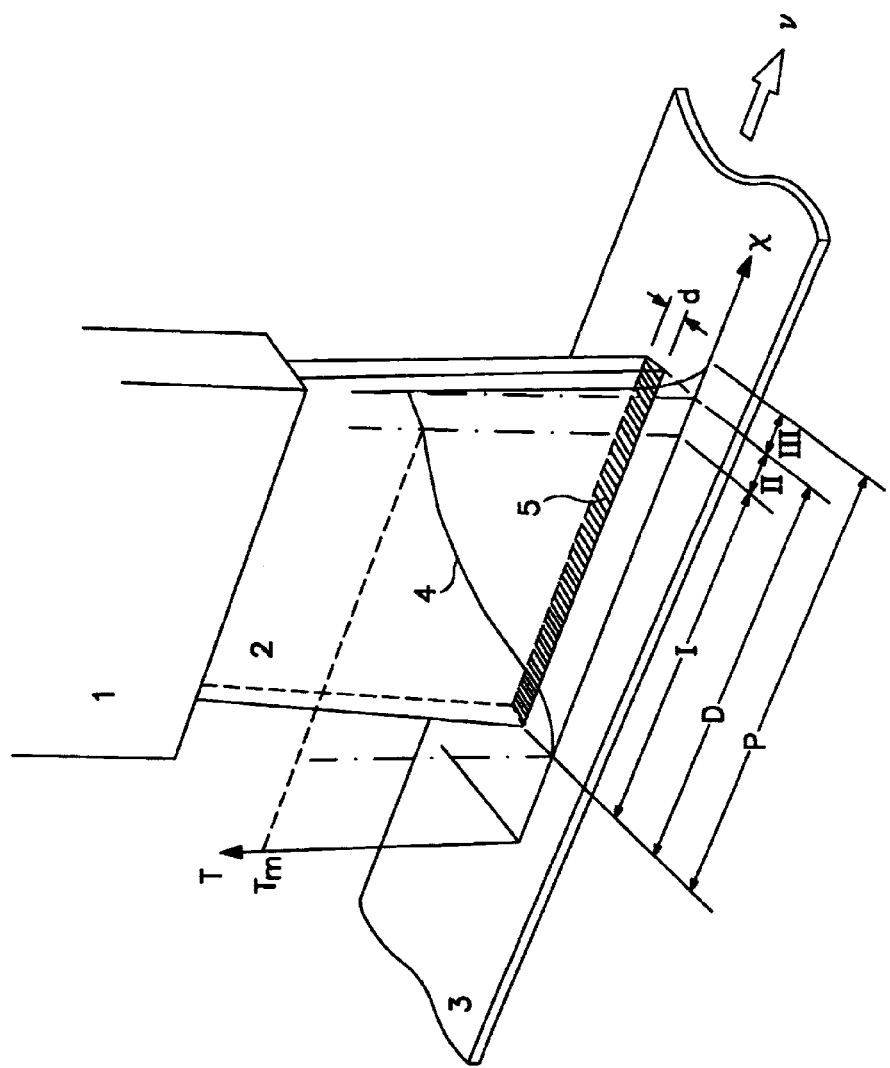
FIG. 1 shows the schematic representation of the temperature profile using a linear, curtain-like laser beam on a surface.

FIG. 1 shows a laser source 1 with a laser beam 2 collimated in the manner of a curtain, which produces a linear irradiation zone 5 on the polymer material 3. The irradiation zone 5 has a width d and a length D that can be influenced by the appropriate optics. The polymer material 3 is moved at the speed v in the direction of the arrow. Also represented in the figure is the temperature profile 4, with the temperature T against the distance x. As can be seen from the figure and the line 4, the temperature in the material rises continuously in the preheating zone I and reaches the melting temperature Tm at the end. From that point on, the melting zone II begins as far as the end of the radiation zone 5, whose length is designated by D. The temperature then falls in the cooling zone III. The entire duration of the welding process is designated by P.

Figure 2:
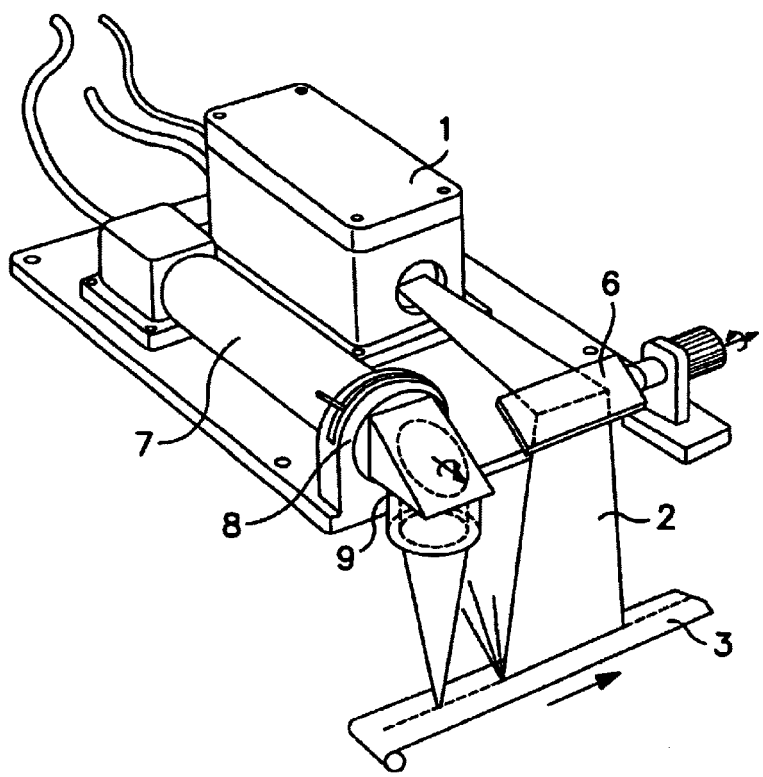
FIG. 2 shows the schematic representation of an arrangement having a linear laser beam and a point laser or pyrometer for temperature measurement following said laser beam in the direction of movement.

FIG. 2 represents, by way of example for the basic explanation, an arrangement which shows the curtain-like laser beam 2 according to FIG. 1, which strikes a material 3, for example film, moved in the direction of the arrow. The laser beam produced by the laser source 1 is deflected by means of a deflection device 6, which also makes possible an appropriate movement transversely with respect to the direction of movement of the material 3. In addition to the laser source 1, either a further laser source 7, and/or a pyrometer for IR measurement can be arranged. The latter device has a rotatable head 8, which permits a freely definable movement along the material, so that here, depending on the use, point-like additional heating or corresponding temperature measurement is possible without the optical elements 9 having to be replaced. Using the corresponding pyrometer, the temperature measurement can be carried out at any desired point along the welding line. The use of point lasers and pyrometers can also be integrated by means of the construction beside the line source, specifically by the point laser being introduced into the material by the optics and the heat radiation being collected via the same optical path and introduced into the pyrometer.

Figure 3:
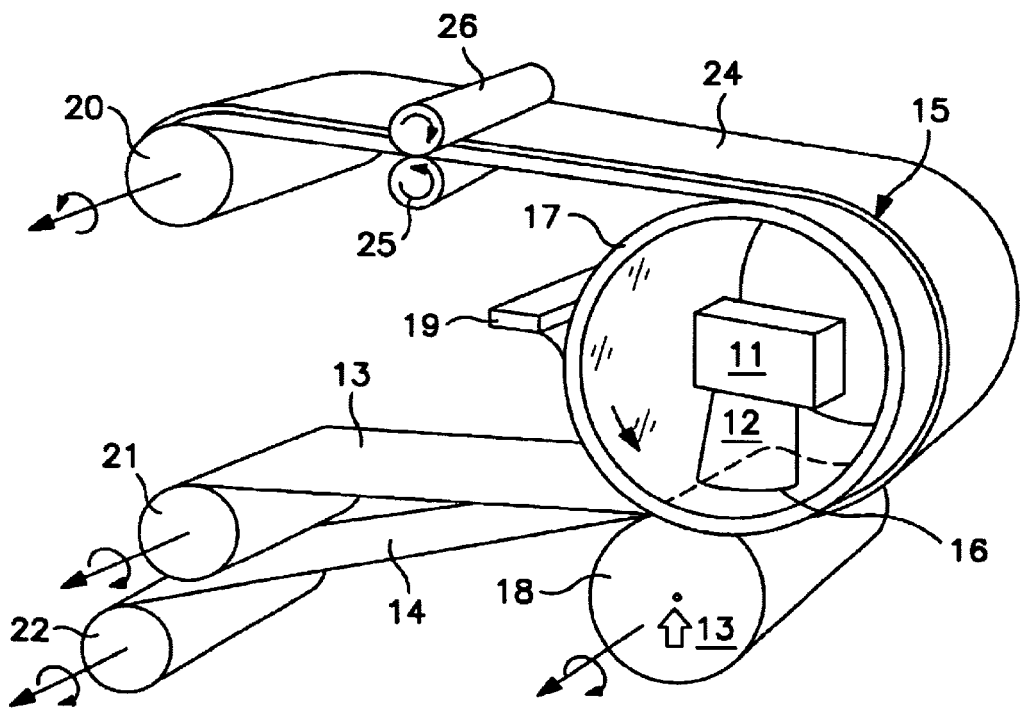
FIG. 3 shows the schematic representation of an apparatus for joining two polymer webs.
Figure 4:
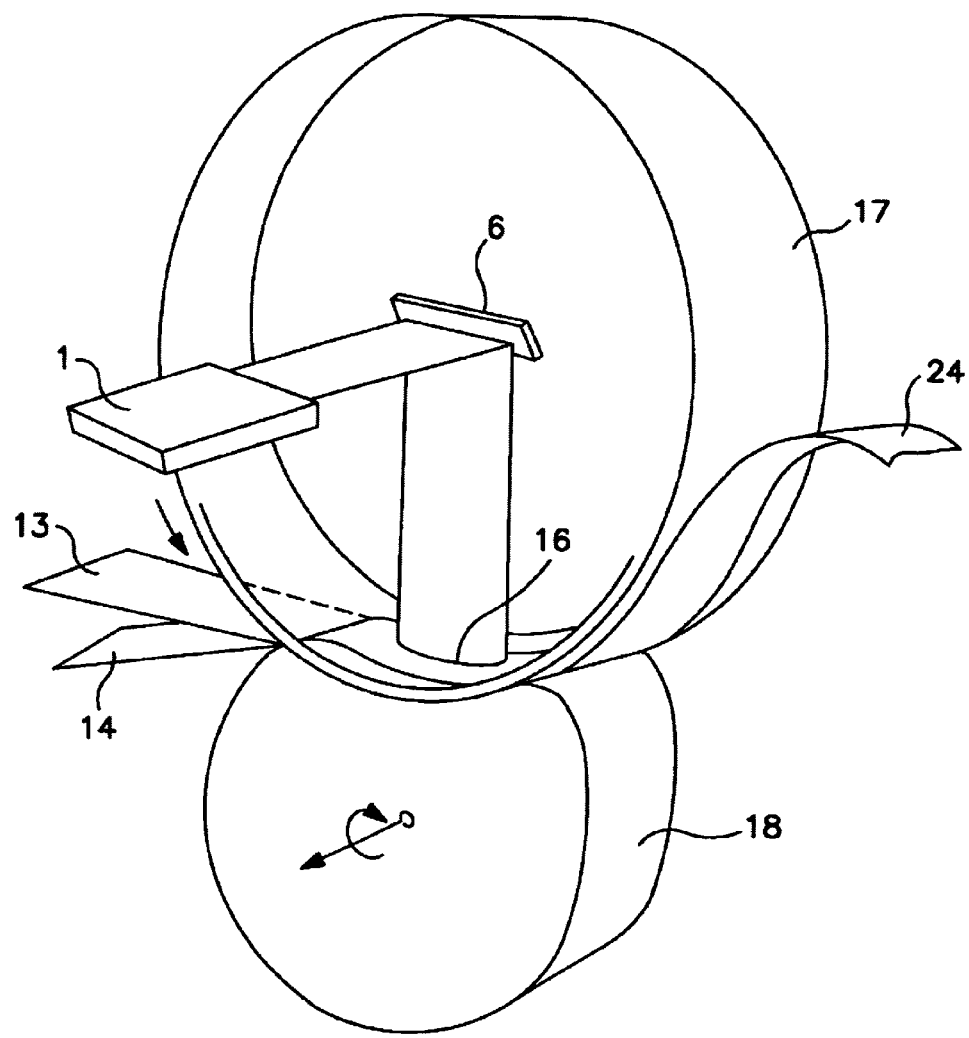
FIG. 4 shows a schematic, enlarged representation of the transparent roller and the opposing roller with a deflection mirror.

FIG. 3 shows the schematic arrangement of the individual elements in an apparatus. Represented schematically in the figure is a laser source 11 in a transparent roller 17. This is done merely for exemplary reasons since here, in principle, and also more feasible in practice, use is made of a deflection mirror 6, as shown in FIG. 4. The laser source 11 produces a curtain-like laser beam 12 which, in the area 16 between the transparent roller 17, for example made of quartz glass or PMMA, and the easily deformable roller 18, for example made of resilient material, produces a linear irradiation zone. The film-like material 13, 14 is unrolled by the rollers 21 and 22 and led through between the two contrarotating passive rollers 17 and 18. The material is advanced by the drive rollers 25 and 26. The easily deformable opposing roller 18 can be regulated in terms of the contact pressure, as represented by the arrow 13. The films 13, 14 joined to each other are curved easily between the two rollers 17, 18, corresponding to the curvature of the roller 17. As a result, the films 24 joined to each other by the welded seam 15 are led around the roller 17 in their further course and rolled up on to the take up roller 20 with the same curvature. As the figure reveals, the deformation of the opposing roller 18 achieves the situation where a correspondingly long pressing area is available, which is longer than the irradiation zone 16.

In the exemplary embodiment, two materials are joined to each other. In principle, it is also possible to join three materials to one another, the heat produced at the contact surface being transferred to the third film if the central material is sufficiently thin.

Additionally indicated schematically in the figure, at 19, is a cleaning device in the form of a brush. Furthermore, not illustrated in the figure but easily comprehensible and feasible for those skilled in the art, one or more masks can be provided in the roller 17 in order to give the welded seam 15 a specific contour. In addition, flat pressure sensors, not illustrated, can be provided on the outer circumference of the second roller 18, via which sensors the contact pressure can be monitored. It is also possible to provide the roller 18 with a resilient covering and to fit the sensors under the covering.

With an apparatus of this type, with a laser output of 70 W and a welding line 15 mm long, a welding speed of 400 mm per second can be achieved. In the case of point-like welding or with a laser beam transverse with respect to the direction of movement and with the same width (1 mm), the welding process runs 15 times more slowly.

FIG. 4 shows the transparent roller 17 and the easily deformable roller 18 enlarged again, a deflection mirror 6 which deflects the laser beam coming from the light source on to the line 16 being arranged in the roller 17.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An apparatus for joining an upper endless polymer material which is transparent to a laser beam to a lower endless polymer material which is absorbent to the laser beam, comprising:
    at least one linear laser beam;
    a first tubular roller and a second contrarotating roller, the first tubular roller is constructed of a material which is transparent to the laser beam and the second roller is constructed of a deformable material, wherein the first and second rollers define a contact area for pressing the upper and lower endless polymer materials together, wherein the at least one linear laser beam is directed through the material of said first tubular roller and the upper polymer material to the contact area between the upper polymer material and the lower polymer material, thereby heating and melting said materials, said linear laser beam is arranged in the direction of movement of the materials through the contrarotating rollers.

2. The apparatus as claimed in claim 1, wherein a device for the IR measurement of the temperature is arranged in the first roller (17), and is moveable with respect to the contact area.

3. The apparatus as claimed in claim 2, further including a point-like laser beam after the linear laser beam in the direction of movement through the contact area.

4. The apparatus as claimed in claim 1, comprising a cleaning device on an outer circumference of the first roller.

* * * * *